May 17, 1955

J. ZENTNER 2,708,377

SHARPENING DEVICE

Filed Sept. 24, 1952

INVENTOR.
JOHN ZENTNER
BY Arthur H. Sturges
Attorney.

May 17, 1955  J. ZENTNER  2,708,377
SHARPENING DEVICE
Filed Sept. 24, 1952  2 Sheets-Sheet 2

INVENTOR.
JOHN ZENTNER
BY Arthur H. Sturges
Attorney.

United States Patent Office 2,708,377
Patented May 17, 1955

2,708,377

SHARPENING DEVICE

John Zentner, Creston, Nebr.

Application September 24, 1952, Serial No. 311,226

3 Claims. (Cl. 76—85)

This invention relates to machines for cutting and sharpening tools and implements particularly of the type used in farming, and in particular a machine having a mandrel for holding a disc of a disc harrow and a tool holder positioned to retain a tool in cutting relation with the edge of a disc rotated by the mandrel.

The purpose of this invention is to provide a machine tool with which a farmer or farm mechanic may sharpen the peripheral edge of a disc, or cut a ring from the edge of a disc, reducing the diameter of the disc.

Discs of this type, as used in farm equipment, are concavo-convex in cross section and one farm may have discs of several different sizes. The discs are usually provided with square centrally positioned openings for receiving square shafts, and these center openings are also of different sizes. In traveling over the ground, as in cultivating, the discs often come in contact with rocks, roots, and other obstacles, and as a result the sharp edges wear rapidly and small pieces are often broken from the edges. It not only requires less horsepower to draw sharp discs than dull discs over the soil, but the sharp discs pulverize the soil more efficiently and also reduce trash and particularly corn stalks to mulch in less time than discs with dull edges. For this reason it is desirable that discs of this type be sharpened annually.

With this thought in mind this invention contemplates a mandrel mounted on a stand, a motor for driving the mandrel through a gear reduction unit, clamping elements for securing a disc in position on the mandrel, and a tool holder for retaining a cutting tool in position for working on the edge of a disc positioned on the mandrel.

The object of this invention is, therefore, to provide a device adapted for use by the average farmer, with which the edges of discs may readily be sharpened.

Another object of the invention is to provide a machine tool particularly adapted for machining the peripheral edges of discs, with which rings may be cut from the discs for reducing the diameters thereof.

The conventional discs for farm use are provided with centrally positioned square openings with which the discs are mounted on shafts, and as equipment on which discs are used is manufactured by different manufacturers the size of the center opening varies. For this reason, it is another object of this invention to provide a mounting mandrel for the discs in which mandrels of different sizes may be used in the same machine.

A further object of this invention is to provide a machine for working on the edges of discs in which the discs are readily removable and replaceable.

A still further object of this invention is to provide a machine for sharpening and turning down the peripheral edges of discs in which the machine is of a simple and economical construction.

With these and other objects and advantages in view the invention embodies a stand having a mandrel journaled on the upper surface, with a motor also mounted on the stand and adapted to drive the mandrel through a reduction gear and transmission, and a tool holder pivotally mounted on the stand and positioned whereby the cutting edge of a tool secured therein is adapted to cut the edge of a disc clamped on the mandrel.

Other features and advantages of the invention will appear from the following description taken in connection with the drawings, wherein.

Figure 1:
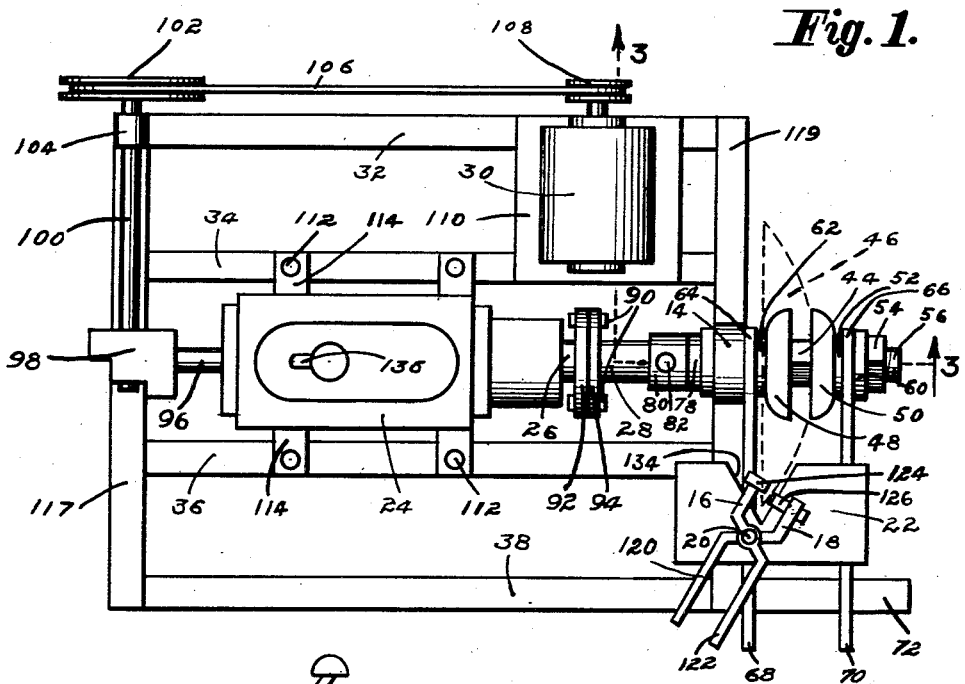
Figure 1 is a plan view of the machine showing a tool in a tool holder on the machine positioned to machine the edge of a disc clamped on a mandrel of the machine.
Figure 2:
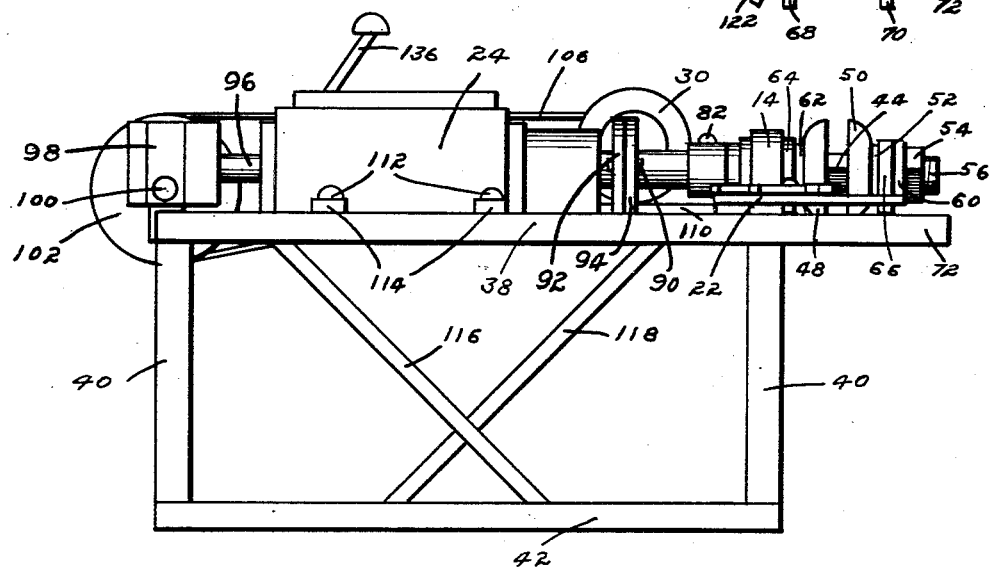
Figure 2 is a side elevational view of the machine.

Referring now to the drawings wherein like reference characters denote corresponding parts the disc sharpening and cutting machine of this invention includes a mandrel 10 mounted in a bushing 12 in a bearing 14, a tool holder having arms 16 and 18 pivotally mounted with a pin 20 on a support plate 22, a transmission 24 to which the mandrel 10 is connected by shafts 26 and 28, a motor 30 for driving the transmission, and a stand having spaced longitudinally disposed beams 32, 34, 36 and 38 supported by posts 40 from beams 42 forming a base.

Figure 3:
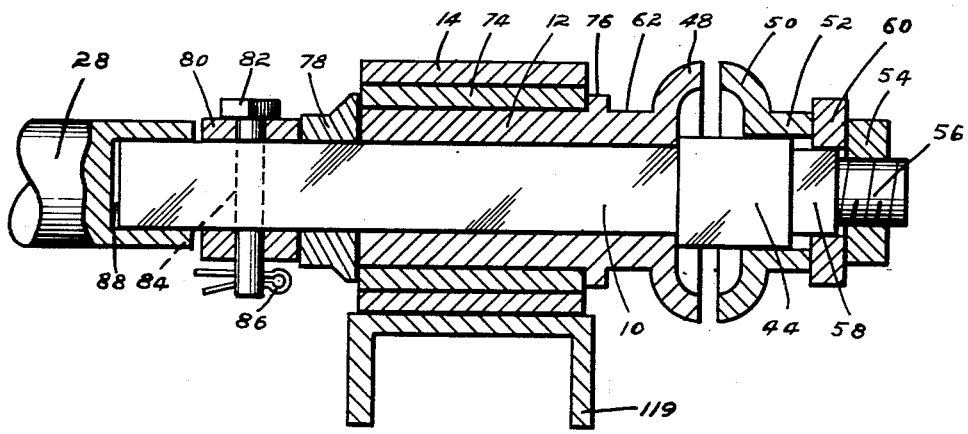
Figure 3 is a longitudinal section taken on line 3—3 of Figure 1 illustrating the mandrel with the disc clamping elements thereon and showing the parts on an enlarged scale.

The mandrel 10, which is illustrated as being square, may be formed with a suitable number of flat sides, and as shown in Figure 3, the mandrel is provided with an enlarged section 44, designed to fit snugly into the square opening in the center of a disc, as indicated by the numeral 46, and the disc is clamped between an arcuate flange 48 on the end of the bushing 12, and a similar flange 50 extended from a hub 52. The flange 50 is clamped against the disc by a nut 54 on a threaded stud 56 extended from a section 58 at the end of the mandrel. A washer 60 is provided on the section 58 and positioned between the nut 54 and hub 52.

The bushing 12 is also provided with a hub portion similar to the hub 52, as indicated by the numeral 62 and arcuate ends 64 and 66 of parallel bars 68 and 70 extend over the hubs 62 and 52, as shown in Figure 1. The opposite ends of the bars 68 and 70 are supported on an extension 72 of the upper beam 38 of the stand. The bars 68 and 70 provide supporting means for the support plate 22.

The bushing 12 is journaled in a sleeve 74 in the bearing 14 and the bushing is secured in position with a collar 76 at one end and a washer 78 at the other. The washer 78 is held in position with a set collar 80 which is secured in position on the mandrel with a bolt 82 which extends through the set collar and through an opening 84 in the mandrel. The bolt is held in place with a cotter pin 86.

The end of the mandrel extends into a socket 88 in the end of the shaft 28 and the shaft 28 is secured to the shaft 26 with bolts 90 which extend through a flange 92 on the shaft 26 and a similar flange 94 on the shaft 28.

The shaft 26 extends from one end of the transmission 24, and a shaft 96 extended from the opposite end of the transmission extends into a gear case 98 at the end of a shaft 100, on the opposite end of which a pulley 102 is mounted. One end of the shaft 100 is journaled in the gear case and the opposite end is journaled on the frame or stand with a bearing 104. The shaft 100 is driven by a belt 106 from the motor 30, the belt being trained over the pulley 102 at one end, and also over a pulley 103 on the motor.

The motor 30 is mounted on the beams 32 and 34 of the stand with a plate 110 and the transmission is secured to the beams 34 and 36 with bolts 112 which are positioned in lugs 114 extended from the transmission housing. The stand is provided with diagonal braces 116 and 118, and end beams 117 and 119, as shown.

Figure 4:
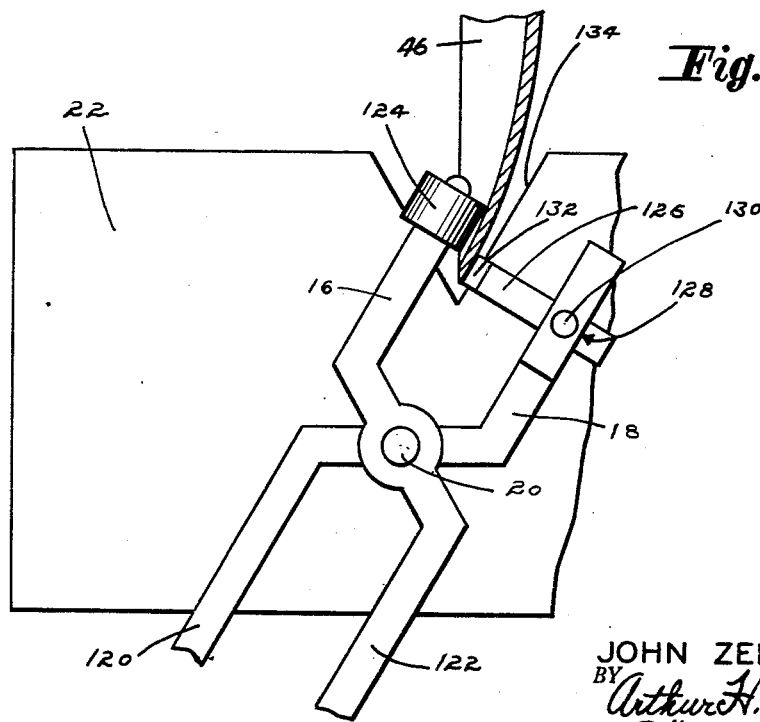
Figure 4 is a detail, also with the parts shown on an enlarged scale, illustrating a tool holder pivotally mounted on a support plate of the machine and showing a tool in the holder in engagement with the edge of a disc, the disc being shown in section.

The arm 16 of the tool holder is provided with a handle 120 and the arm 18, with a similar handle 122 and, as shown in Figure 4, the arm 16 is also provided with a roller 124 that is positioned to bear against the inner surface of a disc to provide an anvil or backing up element for resisting pressure resulting from a cutting tool 126 secured in a socket 128 of the arm 18. The tool 126 is secured in position in the socket with a screw 130 whereby a cutting edge 132 thereof may be held in engagement with a disc.

With the support plate 22 supported on the bars 68 and 70 and with the arcuate ends 64 and 66 of the bars resting on the hubs 62 and 52 the support plate is positioned whereby a disc on the mandrel registers with a V-shaped notch 134 in the edge of the support plate. By this means the tool holder is accurately positioned in relation to the discs and the cutting tool may be used for sharpening the edge of the disc or for reducing the size of a disc, as may be desired.

Mandrels are provided with disc holding sections of different sizes and with the mandrels interchangeable the machine is readily set to accommodate discs having centrally disposed openings of different sizes.

Different types of cutting or grinding tools may be used in the tool holder and the speed of the disc being worked on is controlled by a gear shift lever 136 of the transmission 24.

From the foregoing description it is thought to be obvious that a sharpening device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. In a cultivating disc sharpening machine, the combination which comprises a stand, a shaft having a square socket in one end rotatably mounted on the stand, a bearing aligned with the shaft and mounted on an end of the stand, a bushing having a square longitudinally disposed opening extended therethrough and having an arcuate flange on an extended end rotatably mounted in said bearing, a square mandrel having an enlarged square block spaced inwardly from one end extended through said bushing and positioned with the end opposite to that on which the block is positioned extended into the square socket of the shaft, a set collar having a bolt extended therethrough positioned on the mandrel on the inside of the bearing for retaining the mandrel, and bushing in the bearing and the end of the mandrel in the square socket of the shaft, an arcuate flange complementary to the arcuate flange of the bushing carried by a hub positioned on the square block of the mandrel and adapted to coact with the arcuate flange of the bushing to grip the web of a disc positioned between the arcuate flanges and having a square opening that is extended over the square block, said mandrel having a threaded stud on the end extended from the block, a nut and washer on said stud for clamping the web of the disc between the flanges, a cutting tool mounted on the stand and positioned to engage the side surfaces of the disc the web of which is positioned between the arcuate flanges, and means for rotating said shaft.

2. In a cultivating disc sharpening machine, the combination which comprises a stand, a shaft having a coupling flange on one end extended from a transmission housing mounted on the stand, a shaft having a complementary flange on one end and a square socket in the opposite end secured to the shaft extended from the transmission housing by bolts and aligned with said shaft, a bearing aligned with said shafts and mounted on an end of the stand, a bushing having a square longitudinally disposed opening therethrough and having an arcuate flange on an extended end rotatably mounted in said bearing, a square mandrel having an enlarged square block spaced inwardly from one end extended through said bushing and positioned with the end opposite to that on which the block is positioned extended into the square socket of the shaft, a set collar having a bolt with a cotter pin therein extended therethrough on the mandrel and positioned on the inside of the bearing for retaining the mandrel and bushing in the bearing and the end of the mandrel in the square socket of the shaft, an arcuate flange complementary to the arcuate flange of the bushing carried by a hub positioned on the square block of the mandrel and adapted to coact with the arcuate flange of the bushing to grip the web of a disc positioned between the flanges and having a square opening extended over the square block of the mandrel, said mandrel having a threaded stud on the end extended from the block, a nut and washer on said stud for clamping the web of the disc between the arcuate flanges, a support plate mounted on the stand, a cutting tool mounted on said support plate and positioned to engage side surfaces of the disc the web of which is positioned between the arcuate flanges, and means for actuating said transmission.

3. In a cultivating disc sharpening machine, the combination which comprises a stand, a shaft having a coupling flange on one end and a square socket extended inwardly in the opposite end positioned on the stand, a transmission having a coupling flange extended from one end mounted on the stand and positioned with the coupling flange thereof abutting the coupling flange of the shaft, means securing said coupling flanges together, a motor mounted on the stand, means operatively connecting the motor to the transmission, a bearing mounted on the stand and aligned with said shaft, a bushing having a longitudinally disposed square opening therethrough and having an arcuate flange on one end rotatably mounted in said bearing, a square mandrel having an enlarged block spaced inwardly from one end extended through said bushing and positioned with the end opposite to the end on which the block is positioned extended into the square socket in the end of the shaft, a set collar having a bolt with a cotter pin therein extended therethrough on the mandrel and positioned on the inside of the bearing for retaining the mandrel and bushing in the bearing and the inner end of the mandrel in the square socket of the shaft, a hub positioned on the block of the mandrel and having an arcuate flange complemental to the arcuate flange of the bushing and positioned to coact therewith for gripping the web of a disc positioned on the block of the mandrel, clamping means on the extended end of the mandrel for retaining the disc on the block of the mandrel, said stand having an extension at one side and positioned on the end on which the mandrel is positioned, spaced parallel bars at one side of the stand and positioned with one of the ends thereof resting upon said extension and the opposite end of one bar on the hub of the arcuate flange and of the other bar on the bushing adjacent the arcuate flange thereof, a plate having a notch therein and providing a support positioned on said parallel bars, and a tool holder having pivotally connected arms with handles extended therefrom positioned on said support plate and having a roller on one arm and a cutting tool on the other.

(References on following page)

References Cited in the file of this patent

UNITED STATES PATENTS

| | | |
|---|---|---|
| 499,907 | Casey | June 20, 1893 |
| 528,922 | Cass | Nov. 13, 1894 |
| 544,889 | Evans | Aug. 20, 1895 |
| 580,385 | Durkee | Apr. 13, 1897 |
| 717,657 | Caffarel | Jan. 6, 1903 |
| 797,565 | Durner | Aug. 22, 1905 |
| 809,334 | Strain | Jan. 9, 1906 |
| 929,904 | Ware | Aug. 3, 1909 |
| 930,263 | Adamson | Aug. 3, 1909 |
| 1,599,355 | Arthur | Sept. 7, 1926 |
| 2,533,009 | Harsh | Dec. 5, 1950 |